(12) United States Patent
Akula

(10) Patent No.: US 10,121,023 B2
(45) Date of Patent: Nov. 6, 2018

(54) UNVEIL INFORMATION ON PROMPT

(71) Applicant: ORACLE INTERNATIONAL CORPORATION, Redwood Shores, CA (US)

(72) Inventor: Nagasravani Akula, Perala (IN)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 13/717,897

(22) Filed: Dec. 18, 2012

(65) Prior Publication Data
US 2014/0173450 A1 Jun. 19, 2014

(51) Int. Cl.
G06F 3/0481 (2013.01)
G09G 5/00 (2006.01)
G06F 21/62 (2013.01)

(52) U.S. Cl.
CPC .... *G06F 21/6245* (2013.01); *G06F 2221/032* (2013.01)

(58) Field of Classification Search
CPC .... G06F 3/0481; G06F 21/6218; G06F 3/011; H04L 29/06
USPC ...... 715/741, 780, 760; 726/4, 6, 8; 707/636
See application file for complete search history.

(56) References Cited

U.S. PATENT DOCUMENTS

| | | | |
|---|---|---|---|
| 6,073,241 A * | 6/2000 | Rosenberg | H04L 29/06 726/3 |
| 6,820,204 B1 * | 11/2004 | Desai et al. | 726/6 |
| 7,254,586 B2 | 8/2007 | Chen et al. | |
| 7,523,308 B2 * | 4/2009 | Dadhia et al. | 713/166 |
| 7,747,572 B2 * | 6/2010 | Scott et al. | 707/636 |
| 7,870,386 B2 | 1/2011 | Forlenza et al. | |
| 8,069,489 B2 * | 11/2011 | Mithal et al. | 726/33 |
| 8,245,150 B2 * | 8/2012 | Katter et al. | 715/780 |
| 8,464,317 B2 * | 6/2013 | Hinton et al. | 726/4 |
| 8,484,241 B2 * | 7/2013 | Bouse et al. | 707/769 |

(Continued)

FOREIGN PATENT DOCUMENTS

GB 2478916 A 9/2011

OTHER PUBLICATIONS

Scalabium, Show Password Version 2.1 introduction, Feb. 2005.*
(Continued)

*Primary Examiner* — Jennifer To
*Assistant Examiner* — Jasmine Wan
(74) *Attorney, Agent, or Firm* — Kilpatrick Townsend and Stockton LLP

(57) ABSTRACT

Embodiments of the invention provide systems and methods for controlling presentation of sensitive information in a user interface of an application. More specifically, embodiments of the present invention provide for masking the sensitive information when being entered by the user. However, if the user wants to verify the entry or display the sensitive information in readable text, the information can be displayed or unmasked upon request. For example, in response to the user clicking a button or other control of the user interface associated with the sensitive information or by another mouse or keyboard event, the requested sensitive information can be unmasked and displayed in the clear, for example as a tool tip or in the originally presented element of the user interface. The user can then close the tooltip or mask the information, e.g., after verification of what he/she typed.

19 Claims, 8 Drawing Sheets

(56) References Cited

U.S. PATENT DOCUMENTS

| | | | |
|---|---|---|---|
| 8,528,064 B2* | 9/2013 | Nichols et al. | 726/8 |
| 2001/0005890 A1* | 6/2001 | Nitaki | G06F 21/6218 |
| | | | 726/12 |
| 2003/0154403 A1* | 8/2003 | Keinsley et al. | 713/201 |
| 2005/0140497 A1 | 6/2005 | Chiviendacz et al. | |
| 2005/0222892 A1* | 10/2005 | Sutherland et al. | 705/10 |
| 2006/0056626 A1 | 3/2006 | Keohane et al. | |
| 2006/0074897 A1 | 4/2006 | Fergusson | |
| 2007/0066288 A1* | 3/2007 | Soelberg | H04M 3/4931 |
| | | | 455/415 |
| 2007/0150827 A1* | 6/2007 | Singh | G06F 3/011 |
| | | | 715/773 |
| 2007/0245032 A1* | 10/2007 | Kishorvarshney | |
| | | | H04L 63/0245 |
| | | | 709/229 |
| 2008/0115078 A1 | 5/2008 | Girgaonkar | |
| 2009/0132419 A1 | 5/2009 | Grammer et al. | |
| 2010/0030795 A1 | 2/2010 | Pattabhi et al. | |
| 2010/0042933 A1* | 2/2010 | Ragusa | 715/760 |
| 2010/0205189 A1 | 8/2010 | Ebrahimi et al. | |
| 2010/0242087 A1* | 9/2010 | Matsumoto | 726/3 |
| 2012/0036452 A1 | 2/2012 | Coleman et al. | |
| 2014/0053098 A1* | 2/2014 | Leyon | 715/780 |

OTHER PUBLICATIONS

Author Unknown, "Internet Explorer Password Recovery and Passwords Unmask Tool" 001Micron, [retrieved on Sep. 30, 2013] 1 page. Retrieved from: http://www.001micron.com/micron/int-exp-pass-rec.html.

* cited by examiner

| | |
|---|---|
| Name: | John Doe _405_ |
| Address: | 123 Main Street _410_ |
| | Anytown, USA _415_ |
| Phone: | 123-456-7890 _420_ |
| D.O.B. | XXXXXXXXX _425_ |
| S.S.N. | XXXXXXXXX _435_ |

Name: John Doe

Address: 123 Main Street

Anytown, USA

Phone: 1̶2̶3̶-4̶5̶6̶-7̶8̶9̶0̶

Password
*455*
*450*

440

D.O.B. X

S.S.N. XXXXXXXXX

| Name: | John Doe |
| Address: | 123 Main Street |
| | Anytown, USA |
| Phone: | 123-456-7890 |
| D.O.B. | July 4, 1976  *425* | ○ |
| S.S.N. | XXXXXXXXX  *435* | ○ |

UNVEIL INFORMATION ON PROMPT

BACKGROUND OF THE INVENTION

Embodiments of the present invention relate generally to methods and systems for presenting information in a user interface of an application and more particularly to controlling access to and presentation of sensitive information.

A wide variety of different applications use sensitive information like credit card information, date of birth, and other personal or otherwise secret or discrete information. Such information is often displayed and/or input through a user interface of the application such as a webpage presented to and rendered by a user's device such as her desktop computer, laptop, tablet, cellphone, or other device. For example, a user may be required to enter a credit card number and other information through a webpage in order to complete a purchase transaction or to provide a password and/or other secret information to logon or access the application or functions of the application. But, users also take some time to input and complete the information on that page when performing transactions. So, an over-the-shoulder attack where a nearby observer watches and records or remembers the sensitive information can easily happen especially when transactions with sensitive information are being done in public places.

To prevent such attacks, some applications obscure or mask the sensitive information. For example, when the sensitive information is displayed and/or as it is being entered by the user, this information may be replaced with a character such as an "*" or other replacement character or graphic to hide the sensitive information. However, such an approach is frequently inconvenient for the user. For example, when the user is entering or inputting sensitive information, like when setting a password, the user may be required to re-enter or confirm the information that is obscured or masked as it is entered. In other cases, this approach may be ineffective in preventing over-the-shoulder attacks. For example, while entering password in a mobile there is a time lag during which the plain text is displayed before it is converted into an "*." Thus, the plain text of the sensitive information is still available and vulnerable to a nearby observer for a short time. Hence, there is a need for improved methods and systems for controlling access to and presentation of sensitive information.

BRIEF SUMMARY OF THE INVENTION

Embodiments of the invention provide systems and methods for controlling presentation of sensitive information in a user interface of an application according to one embodiment of the present invention. According to one embodiment, controlling presentation of sensitive information in a user interface of an application can comprise identifying at least one field of information as sensitive and saving an indication of the at least one field of information being identified as sensitive. One or more users can be registered. For example, registering a user can include saving information identifying the user and which can be used to determine whether to grant the user access to the at least one field of information identified as sensitive.

A request for the user interface of the application and a user session of the application can be initiated for a registered user with an initial authentication level for the user. The user interface of the application can be generated based on the saved indication of the at least one field of information being identified as sensitive. The user interface can comprise a plurality of elements for displaying application information including at least one field of information identified as sensitive. The element displaying the at least one field of information identified as sensitive can be masked. The generated user interface can be presented to a user of the application.

A request can be received from the user to unmask the element displaying the at least one field of information identified as sensitive. In response to the request, a determination can be made as to whether to grant the user access to the at least one field of information identified as sensitive. Determining whether to grant the user access to the at least one field of information identified as sensitive can further comprise determining whether the request from the user to unmask the element displaying the at least one field of information identified as sensitive is a first such request. In response to determining the request from the user to unmask the element displaying the at least one field of information identified as sensitive is the first such request, granting the user access to the at least one field of information identified as sensitive can be based on the initial authentication level for the user and the authentication level for the user updated. The updated authentication level for the user can be less restrictive than the initial authentication level for the user. In response to determining the request from the user to unmask the element displaying the at least one field of information identified as sensitive is not the first such request, granting the user access to the at least one field of information identified as sensitive can be based on the updated authentication level for the user. In either case and in response to determining to grant the user access to the at least one field of information identified as sensitive, the user interface can be updated to unmask the element displaying the at least one field of information identified as sensitive and the updated user interface can be presented to the user.

A determination can be made as to whether to re-mask the element displaying the at least one field of information identified as sensitive. In response to determining to re-mask the element displaying the at least one field of information identified as sensitive, the user interface can be updated to mask the element displaying the at least one field of information identified as sensitive and the updated user interface can be presented to the user.

BRIEF DESCRIPTION OF THE DRAWINGS

FIGS. 4A-4C are a set of exemplary user interfaces illustrating a process for controlling presentation of sensitive information in a user interface of an application according to one embodiment of the present invention.

DETAILED DESCRIPTION OF THE INVENTION

Figure 1:
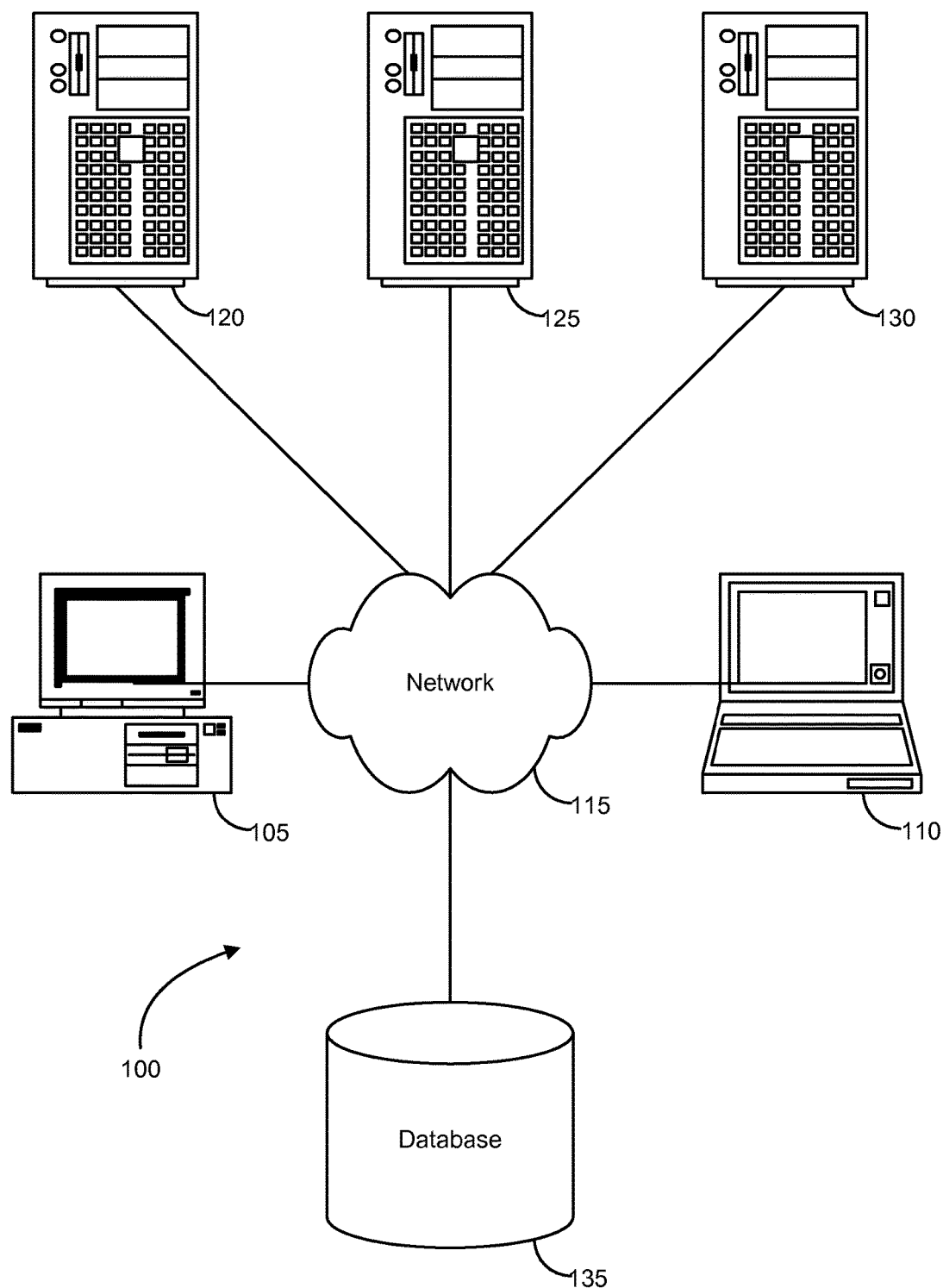
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for controlling presentation of sensitive information in a user interface of an application. More specifically, embodiments of the present invention provide for masking the sensitive information when being entered by the user. However, if the user wants to verify the entry or display the sensitive information in readable text, the information can be displayed or unmasked upon request. For example, in response to the user clicking a button or other control of the user interface associated with the sensitive information or by another mouse or keyboard event, the requested sensitive information can be unmasked and displayed in the clear, for example as a tool tip or in the originally presented element of the user interface. The user can then close the tooltip or mask the information, e.g., after verification of what he/she typed. Embodiments of the present invention may be adapted to mobile applications or applications accessible through mobile devices to address vulnerabilities and inconveniences in dealing with sensitive information through such interfaces. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The servers) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The servers) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
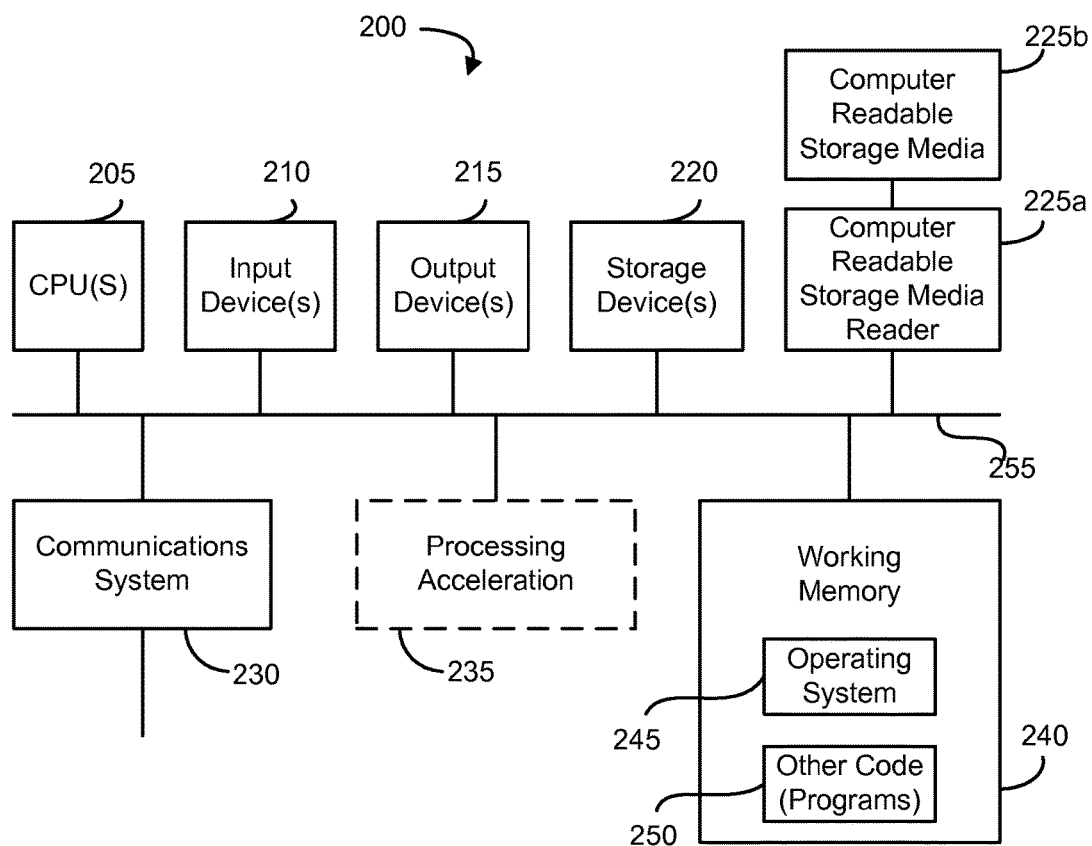
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
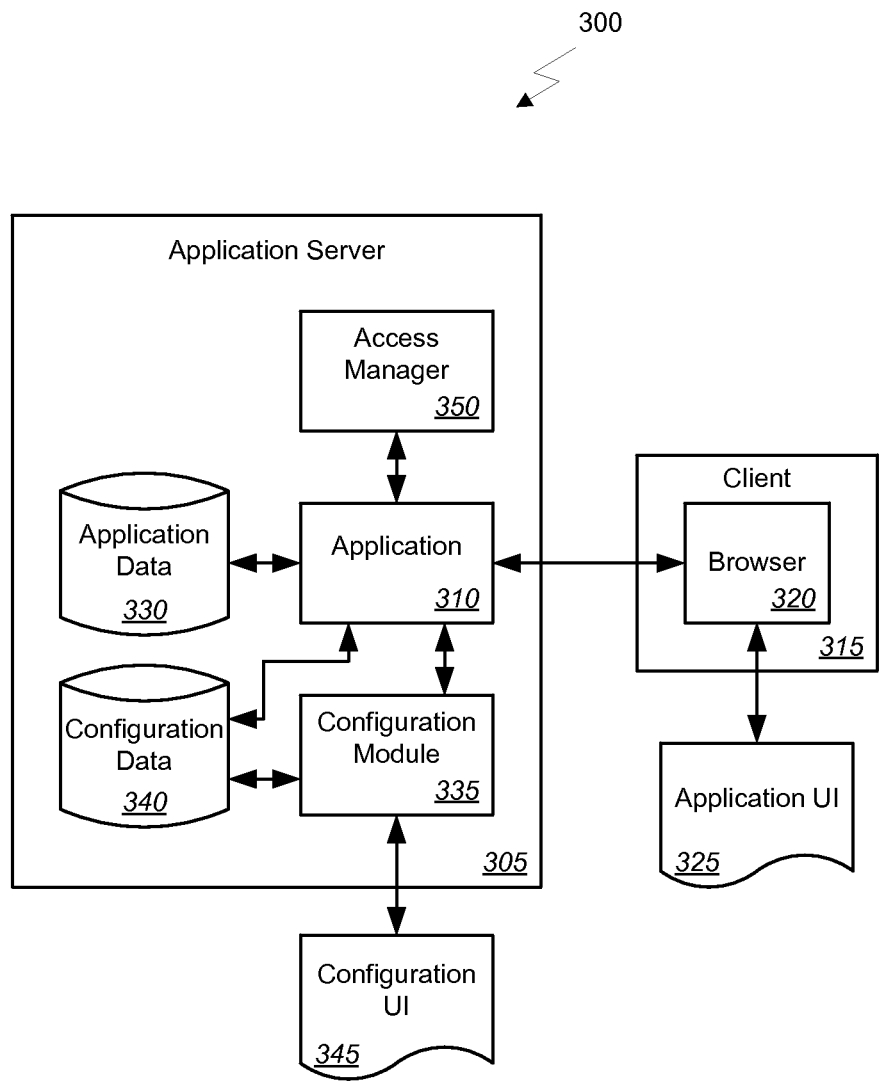
FIG. 3 is a block diagram illustrating, at a high-level, functional components of a system for controlling presentation of sensitive information in a user interface of an application according to one embodiment of the present invention.

FIG. 3 is a block diagram illustrating, at a high-level, functional components of a system for controlling presentation of sensitive information in a user interface of an application according to one embodiment of the present invention. In this example, the system 300 includes an application server 305 such as any of the servers or other computer systems described above. The application server 305 can execute an application 310 which generates an interface 325, e.g., one or more webpages, which may be provided to a client device 315 of a user and which can be in turn rendered by a browser 320 or other application thereon for display to the user. As will be described below, this interface 325 can include information identified as sensitive and thus masked upon display by the client device 315 but which can be made readable, i.e., unmasked, upon request by the user of the client device.

The application server 305 can maintain a set of application data 330 for the application 310 which can include the sensitive information and any other information used by the application 310. The sensitive information can be predefined as such in a variety of different ways but, for example, can be identified as such by an administrator, developer or other user through a configuration interface 345 of a configuration module 335 which in turn sets and stores a set of configuration data 340 (e.g., as a policy) for use by the application 310. Thus, upon execution and when generating the user interface 325, the application can determine which information is considered to be sensitive and therefore masked. The application server 305 can also include an access manager 350 for user by or in conjunction with the application 310 to control access to the sensitive information or other application data 330, for example when the user requests the sensitive information to be unmasked.

Generally speaking, controlling presentation of sensitive information in the user interface 325 of the application 310 can comprise the application 310 generating and presenting the user interface 325 to the user through the client device 315. As will be described in greater detail below, the user interface 325 can comprise a plurality of elements for displaying application information 330 including at least one field of information identified as sensitive. Also as will be described in greater detail below, the element displaying the at least one field of information identified as sensitive can be masked, e.g., presented as a series of asterisks or other characters or graphics in place of the actual text. A request can be received by the application 310 from the user through the application interface 325 to unmask the element displaying the at least one field of information identified as sensitive. For example, the user may click a button or other control associated with the sensitive information in the application interface 325. In response to the request, a determination can be made by the application 310 and/or access manager 350 as to whether to grant the user access to the at least one field of information identified as sensitive. In response to determining to grant the user access to the at least one field of information identified as sensitive, the user interface 325 can be updated by the application 310 to unmask the element displaying the at least one field of information identified as sensitive as will be described in greater detail below.

More specifically, controlling presentation of sensitive information in the user interface 325 of the application 310 can comprise defining sensitive fields in the user interface pages, e.g., by identifying as sensitive through the configuration interface 345 of the configuration module 335 the at least one field of information and saving an indication of the at least one field of information being identified as sensitive in the configuration data 340 of the application 310. The user interface 325 can then later be generated by the application 310 based on the indication of the at least one field of information being identified as sensitive saved in the configuration data 340. Additionally or alternatively, one or more users of the application can be registered, for example through the configuration interface 345 of the configuration module 335. For example, registering the users can include configuration module 35 saving information in the configuration data 340 and/or application data 330 identifying the user that can later be used by the application 310 in determining whether to grant the user access to the at least one field of information identified as sensitive.

After the application information has been defined or configured and users have been registered, a request can be received by the application 310 to provide the user interface 325 to the client device 315. In response, a user session can be initiated by the application 310 for the user with an initial authentication level for the user. The user interface 325 of the application 310 can also be generated and presented based on the saved indication, e.g., saved in the configuration data 340, of the at least one field of information being identified as sensitive. Based on this information, the user interface 325 can be generated and presented to the client device 315 by the application 310 to be rendered and/or displayed by the client device 315, for example by a browser 320 or other client application. As will be described below, the user interface 325 can comprise a plurality of elements for displaying application information including at least one field of information identified as sensitive and the element displaying the at least one field of information identified as sensitive can be masked. The interface 325 may also include one or more elements for requesting the sensitive information to be unmasked. When the user selects or otherwise manipulates such elements, a request can be received by the application 310 from the user to unmask the element displaying the at least one field of information identified as sensitive. In response to the request, a determination can be made by the application 310 and/or access manager 350 as to whether to grant the user access to the at least one field of information identified as sensitive based on the saved information identifying the user, e.g., the user registration information saved in the configuration data 340 and/or application data 330. According to one embodiment, the saved sensitive information may be encrypted. For example, a unique identifier from one or more user information attributes, a hash, or a combination thereof can be used to encrypt (for masking) the information before displaying to the user. In such cases, unmasking can then also include decrypting the sensitive information.

According to one embodiment, determining whether to grant the user access to the at least one field of information identified as sensitive can include determining by the application 310 and/or access manager 350 whether the request from the user to unmask the element displaying the sensitive information is a first such request. In response to determining the request is the first such request, granting the user access to the sensitive information can be based on the initial authentication level for the user, i.e., the initial level set upon start of the user session, and the authentication level for the user can be updated. The updated authentication level for the user can be less restrictive than the initial authentication level for the user. Thus, in response to determining the request from the user to unmask the element displaying the sensitive information is not the first such request, granting the user access to the sensitive information can be based on the updated authentication level for the user. So for example, an initial request may require the user to authenticate by providing a password, passphrase, or other information while a subsequent request may not require further authentication. In either case, in response to the application 310 and/or access manager 350 determining to grant the user access to the at least one field of information identified as sensitive, the user interface 325 can be updated by the application 310 to unmask the element displaying the at least one field of information identified as sensitive and the updated user interface 325 can be presented to the user through the client device 315. Similarly, the user can re-apply the mask to the information once the purpose is served, i.e., the user has seen and verified or confirmed the information. For example, the mask can be re-applied in response to the user again clicking a button or based on another event or action in the user interface. According to one embodiment, re-applying the mask need not require any authentication or re-authentication of the user. According to one embodiment, a relative sensitivity of the information or a sensitivity level can be defined for the sensitive information. For example, a password may be defined as being more sensitive than a Date Of Birth (DOB). Based on the sensitivity level, the information may be unmasked in different ways. Using the same password and DOB example, a tooltip may be used to unmask the more sensitive password text and the relatively less sensitive DOB may be unmasked in the same text field as the masked data.

To further illustrate these processes, a set of exemplary user interfaces are provided and described below. However, it should be understood that the interfaces illustrated and described here are offered only by way of example and are not intended to limit the scope of the present invention. Rather, depending upon the exact implementation, the contents and format of the user interfaces can vary significantly without departing from the scope of the present invention.

FIGS. 4A-4C are a set of exemplary user interfaces illustrating a process for controlling presentation of sensitive information in a user interface of an application according to one embodiment of the present invention. As noted above and as illustrated in FIG. 4A, a user interface 400 according to one embodiment can include a plurality of elements 405-435 for displaying application information including elements 425 and 435 for displaying field of information pre-defined or identified as sensitive. As shown here, the element 425 and 435 displaying the at least one field of information identified as sensitive can be masked, e.g., presented as a series of asterisks or other characters or graphics in place of the actual text. A button or other control 430 and 440 can be associated with each element 425 and 435 displaying sensitive information. The user can request to unmask an element 425 displaying the at least one field of information identified as sensitive, for example, by clicking the button 430 or other control associated with the element 425 containing the desired sensitive information.

As illustrated in FIG. 4B, upon clicking the button 430 or other control associated with the element 425 containing the desired sensitive information, the user may be required to be authenticated and/or authorized before the sensitive information is unmasked. For example, if this is the first request by the user to view sensitive information in the interface 400, a dialog box 450 or other element may be opened in the interface 400 through which the user can provide a password 455 or other identifying information. Upon a successful authentication and/or authorization, the element 425 containing the requested sensitive information can be updated to unmask that information as illustrated in FIG. 4C. According to one embodiment, subsequent requests for sensitive information may not require further authentication of the user. In some cases, the initial or subsequent request may comprise the user manipulating a cursor 455 or other pointer to select an element 435 containing sensitive information. In such cases, unmasking the sensitive information may comprise presenting the sensitive information in a tooltip 460, popup box, or other element. Other variations of the user interface 400 are contemplated and considered to be within the scope of the present invention.

Figure 5:
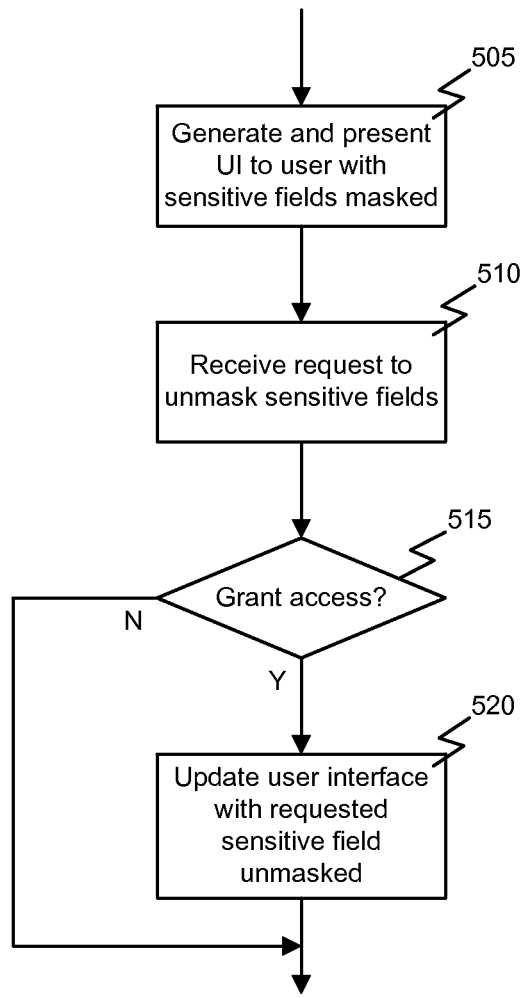
FIG. 5 is a flowchart illustrating a process for controlling presentation of sensitive information in a user interface of an application according to one embodiment of the present invention.

FIG. 5 is a flowchart illustrating a process for controlling presentation of sensitive information in a user interface of an application according to one embodiment of the present invention. As illustrated in this example, controlling presentation of sensitive information in a user interface of an application can comprise generating and presenting 505 the user interface of the application to a user of the application. As described above, the user interface can comprise a plurality of elements for displaying application information including at least one field of information identified as sensitive. Also as described above, the element displaying the at least one field of information identified as sensitive can be masked. A request can be received 510 from the user to unmask the element displaying the at least one field of information identified as sensitive. In response to the request, a determination 515 can be made as to whether to grant the user access to the at least one field of information identified as sensitive. In response to determining 515 to grant the user access to the at least one field of information identified as sensitive, the user interface can be updated 520 to unmask the element displaying the at least one field of information identified as sensitive as described above and the updated user interface can be presented to the user.

Figure 6:
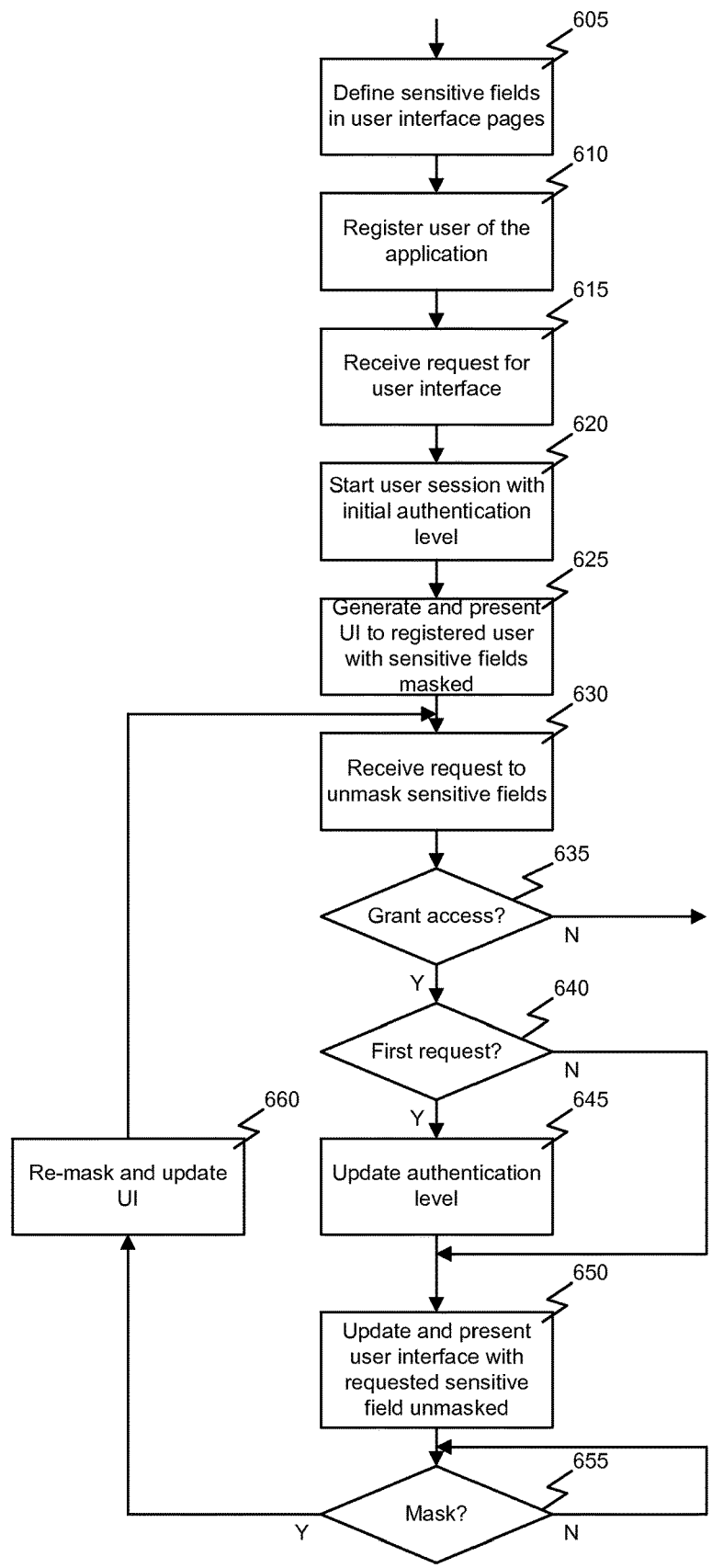
FIG. 6 is a flowchart illustrating additional details of a process for controlling presentation of sensitive information in a user interface of an application according to one embodiment of the present invention.

FIG. 6 is a flowchart illustrating additional details of a process for controlling presentation of sensitive information in a user interface of an application according to one embodiment of the present invention. As illustrated in this example, controlling presentation of sensitive information in a user interface of an application can comprise defining 605 sensitive fields in the user interface pages, e.g., by identifying the at least one field of information as sensitive and saving an indication of the at least one field of information being identified as sensitive. The user interface can then later be generated based on the saved indication of the at least one field of information being identified as sensitive. Additionally or alternatively, one or more users of the application can be registered 610. For example, registering 610 the users can include saving information identifying the user that can later be used in determining whether to grant the user access to the at least one field of information identified as sensitive.

After the application information has been defined 605 or configured and users have been registered 610, a request can be received 615 for the user interface of the application and a user session of the application can be initiated 620 for the user with an initial authentication level for the user. In response, the user interface of the application can be generated and presented 625 based on the saved indication of the at least one field of information being identified as sensitive. The user interface can comprise a plurality of elements for displaying application information including at least one field of information identified as sensitive and the element displaying the at least one field of information identified as sensitive can be masked. A request can be received 630 from the user to unmask the element displaying the at least one field of information identified as sensitive. In response to the request, a determination 635 can be made as to whether to grant the user access to the at least one field of information identified as sensitive based on the saved information identifying the user.

According to one embodiment, determining 635 whether to grant the user access to the at least one field of information identified as sensitive can include determining 640 whether the request from the user to unmask the element displaying the at least one field of information identified as sensitive is a first such request. In response to determining 640 the request from the user to unmask the element displaying the at least one field of information identified as sensitive is the first such request, granting 635 the user access to the at least one field of information identified as sensitive can be based on the initial authentication level for the user and the authentication level for the user can be updating, wherein the updated authentication level for the user can be less restrictive than the initial authentication level for the user. Thus, in response to determining 640 the request from the user to unmask the element displaying the at least one field of information identified as sensitive is not the first such request, granting the user access to the at least one field of information identified as sensitive can be based on the updated authentication level for the user. In either case, in response to determining 635 to grant the user access to the at least one field of information identified as sensitive, the user interface can be updated 650 to unmask the element displaying the at least one field of information identified as sensitive and the updated user interface can be presented to the user. A determination 655 can be made as to whether to re-mask the element displaying the at least one field of information identified as sensitive. For example, determining 655 to re-mask the element can be based on receiving an indication such as a mouse click or other user interface event. In response to determining 655 to re-mask the element displaying the at least one field of information identified as sensitive, the user interface can be updated 660 to mask the element displaying the at least one field of information identified as sensitive and the updated user interface can be presented to the user.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-based method for controlling presentation of sensitive information in a user interface of an application, the method comprising:
    generating a user interface of an application, the user interface comprising a text field for displaying a field of information identified as sensitive, wherein the field of information is associated with a sensitivity level specifically defined for the field of information, wherein different sensitivity level including high-sensitive level or low-sensitive level is defined according to different data content of the field of information, and wherein the text field initially displays the field of information identified as sensitive in a masked form;
    presenting the generated user interface to a user of the application;
    receiving an unmasking request from the user to unmask the field of information identified as sensitive;
    determining whether the unmasking request is a first unmasking request from the user in a session or a subsequent unmasking request from the user in the session;
    determining to grant the user access to the field of information identified as sensitive based on:
        whether the unmasking request is the first unmasking request or the subsequent unmasking request;
        a saved password for the user; and
        the sensitivity level specifically defined for the field of information;
    determining, from a plurality of methods of unmasking, a method of unmasking the field of information identified as sensitive, wherein the determining is based on the sensitivity level specifically defined for the field of information, and wherein the plurality of methods of methods of unmasking comprises:
        displaying, separate from the text field, a tooltip with the field of information in an unmasked form when the sensitivity level specifically defined for the field of information is high-sensitive; and
        replacing, within the text field, the field of information identified as sensitive in the masked form with the field of information in the unmasked form when the sensitivity level specifically defined for the field of information is low-sensitive;
    updating, based on the determined method of unmasking, the user interface to display the field of information in the unmasked form.

2. The method of claim 1, further comprising:
    identifying the field of information as sensitive; and
    saving an indication of the field of information being identified as sensitive, wherein generating the user interface is based on the saved indication of the field of information being identified as sensitive.

3. The method of claim 2, further comprising registering the user, wherein said registering includes saving the password for the user.

4. The method of claim 1, further comprising prior to said generating the user interface of the application:
    receiving a request for the user interface of the application; and
    initiating a user session of the application for the user with an initial authentication level for the user.

5. The method of claim 1,
    wherein the determined method of unmasking includes displaying the tooltip with the field of information identified as sensitive in the unmasked form,
    wherein the method further comprises:
        updating the user interface to display the tooltip with the field of information identified as sensitive in the unmasked form; and
        upon receiving an indication of a mouse click from the user, re-masking the field of information by removing the tooltip from the user interface.

6. The method of claim 1, wherein, when the field of information comprises a password, the sensitivity level specifically defined for the field of information is high-sensitive.

7. The method of claim 1, wherein, when the field of information comprises a date of birth, the sensitivity level specifically defined for the field of information is low-sensitive.

8. A system comprising:
    a processor; and
    a memory coupled with and readable by the processor and storing a set of instructions which, when executed by the processor, cause the processor to control presentation of sensitive information in a user interface of an application by:
    generating the user interface of the application, the user interface comprising a text field for displaying a field of information identified as sensitive, wherein the field of information is associated with a sensitivity level specifically defined for the field of information, wherein different sensitivity level including high-sensitive level or low-sensitive level is defined according to different data content of the field of information, and wherein the text field initially displays the field of information identified as sensitive in a masked form;

presenting the generated user interface to a user of the application;

receiving an unmasking request from the user to unmask the field of information identified as sensitive;

determining whether the unmasking request is a first unmasking request from the user in a session or a subsequent unmasking request from the user in the session;

determining to grant the user access to the field of information identified as sensitive based on:
whether the unmasking request is the first unmasking request or the subsequent unmasking request;
a saved password for the user; and
the sensitivity level specifically defined for the field of information;

determining, from a plurality of methods of unmasking, a method of unmasking the field of information identified as sensitive, wherein the determining is based on the sensitivity level specifically defined for the field of information, and wherein the plurality of methods of unmasking comprises:
displaying, separate from the text field, a tooltip with the field of information in an unmasked form when the sensitivity level specifically defined for the field of information is high-sensitive; and
replacing, within the text field, the field of information identified as sensitive in the masked form with the field of information in the unmasked form when the sensitivity level specifically defined for the field of information is low-sensitive;

updating, based on the determined method of unmasking, the user interface to display the field of information in the unmasked form.

9. The system of claim 8, further comprising:
identifying the field of information as sensitive; and
saving an indication of the field of information being identified as sensitive, wherein generating the user interface is based on the saved indication of the field of information being identified as sensitive.

10. The system of claim 9, further comprising registering the user, wherein said registering includes saving the password for the user.

11. The system of claim 8, further comprising prior to said generating the user interface of the application:
receiving a request for the user interface of the application; and
initiating a user session of the application for the user with an initial authentication level for the user.

12. The system of claim 8,
wherein the determined method of unmasking includes displaying the tooltip with the field of information identified as sensitive in the unmasked form,
wherein the instructions, when executed by the processor, further cause the processor to perform:
updating the user interface to display the tooltip with the field of information identified as sensitive in the unmasked form; and
upon receiving an indication of a mouse click from the user, re-masking the field of information by removing the tooltip from the user interface.

13. The system of claim 8, wherein, when the field of information comprises a password, the sensitivity level specifically defined for the field of information is high-sensitive.

14. The system of claim 8, wherein, when the field of information comprises a date of birth, the sensitivity level specifically defined for the field of information is low-sensitive.

15. A computer-readable memory device, which is non-transitory, storing a set of instructions which, when executed by a processor, cause the processor to control presentation of sensitive information in a user interface of an application by:
generating a user interface of an application, the user interface comprising a text field for displaying a field of information identified as sensitive, wherein the field of information is associated with a sensitivity level specifically defined for the field of information, wherein different sensitivity level including high-sensitive level or low-sensitive level is defined according to different data content of the field of information, and wherein the text field initially displays the field of information identified as sensitive in a masked form;

presenting the generated user interface to a user of the application;

receiving an unmasking request from the user to unmask the field of information identified as sensitive;

determining whether the unmasking request is a first unmasking request from the user in a session or a subsequent unmasking request from the user in the session;

determining to grant the user access to the at least one field of information identified as sensitive based on:
whether the unmasking request is the first unmasking request or the subsequent unmasking request;
a saved password for the user; and
the sensitivity level specifically defined for the field of information;

determining, from a plurality of methods of unmasking, a method of unmasking the field of information identified as sensitive, wherein the determining is based on the sensitivity level specifically defined for the field of information, and wherein the plurality of methods of unmasking comprises:
displaying, separate from the text field, a tooltip with the field of information in an unmasked form when the sensitivity level specifically defined for the field of information is high-sensitive; and
replacing, within the text field, the field of information identified as sensitive in the masked form with the field of information in the unmasked form when the sensitivity level specifically defined for the field of information is low-sensitive;

updating, based on the determined method of unmasking, the user interface to display the field of information in the unmasked form.

16. The computer-readable memory device of claim 15, further comprising prior to said generating the user interface of the application:
receiving a request for the user interface of the application; and
initiating a user session of the application for the user with an initial authentication level for the user.

17. The computer-readable memory device of claim 15, wherein the determined method of unmasking includes displaying the tooltip with the field of information identified as sensitive in the unmasked form, wherein the instructions, when executed by the processor, further cause the processor to perform:
  updating the user interface to display the tooltip with the field of information identified as sensitive in the unmasked form; and
  upon receiving an indication of a mouse click from the user, re-masking the field of information by removing the tooltip from the user interface.

18. The computer-readable memory device of claim 15, wherein, when the field of information comprises a password, the sensitivity level specifically defined for the field of information is high-sensitive.

19. The computer-readable memory device of claim 15, wherein, when the field of information comprises a date of birth, the sensitivity level specifically defined for the field of information is low-sensitive.

\* \* \* \* \*

UNITED STATES PATENT AND TRADEMARK OFFICE
CERTIFICATE OF CORRECTION

PATENT NO. : 10,121,023 B2
APPLICATION NO. : 13/717897
DATED : November 6, 2018
INVENTOR(S) : Akula Page 1 of 1

It is certified that error appears in the above-identified patent and that said Letters Patent is hereby corrected as shown below:

On the Title Page

Column 2, item (57), under Abstract, Line 13, delete "tool tip" and insert -- tooltip --, therefor.

In the Specification

In Column 4, Line 16, delete "tool tip" and insert -- tooltip --, therefor.

In Column 5, Line 21, delete "servers)" and insert -- server(s) --, therefor.

In Column 5, Lines 29-30, delete "servers)" and insert -- server(s) --, therefor.

In the Claims

In Column 12, Line 7, in Claim 1, after "plurality" delete "of methods".

Signed and Sealed this
Twenty-ninth Day of October, 2019

Andrei Iancu
*Director of the United States Patent and Trademark Office*